(12) United States Patent
Seki

(10) Patent No.: US 10,925,214 B2
(45) Date of Patent: Feb. 23, 2021

(54) CONVEYOR ROLLER SET AND HARVESTING MACHINE

(71) Applicant: CNH Industrial America LLC, New Holland, PA (US)

(72) Inventor: Andre Seki, Sorocaba (BR)

(73) Assignee: CNH Industrial America LLC, New Holland, PA (US)

( * ) Notice: Subject to any disclaimer, the term of this patent is extended or adjusted under 35 U.S.C. 154(b) by 153 days.

(21) Appl. No.: 15/988,641

(22) Filed: May 24, 2018

(65) Prior Publication Data

US 2018/0338424 A1 Nov. 29, 2018

(51) Int. Cl.
*A01D 61/00* (2006.01)
*A01D 45/10* (2006.01)

(52) U.S. Cl.
CPC .......... *A01D 61/008* (2013.01); *A01D 45/10* (2013.01)

(58) Field of Classification Search
CPC .... A01D 61/008; A01D 45/10; A01D 45/003; A01D 43/082; A01F 29/06; A01F 29/10
See application file for complete search history.

(56) References Cited

U.S. PATENT DOCUMENTS

| | | | |
|---|---|---|---|
| 3,673,774 A * | 7/1972 | Mizzi | A01D 45/10 56/13.9 |
| 3,942,307 A | 3/1976 | Quick | |
| 4,098,060 A * | 7/1978 | Quick | A01D 45/10 56/13.9 |
| 4,152,883 A | 5/1979 | Quick | |
| 4,194,344 A | 3/1980 | Mizzi | |
| 7,314,191 B2 * | 1/2008 | Nikam | B02C 4/02 100/166 |
| 2001/0037638 A1* | 11/2001 | Krone | A01F 29/10 56/504 |
| 2010/0307121 A1* | 12/2010 | Marchini | A01D 75/28 56/63 |
| 2013/0111871 A1* | 5/2013 | Hinds | B02C 18/18 56/500 |
| 2014/0174048 A1 | 6/2014 | Lawson et al. | |
| 2015/0331408 A1 | 11/2015 | Richard | |
| 2019/0008092 A1* | 1/2019 | Bertino | A01F 29/06 |

FOREIGN PATENT DOCUMENTS

| | | | |
|---|---|---|---|
| BR | 102015015922-6 A2 | 1/2017 | |
| CN | 203968705 U * | 12/2014 | ............ A01D 57/01 |
| WO | 2014026255 A1 | 2/2014 | |
| WO | 2015159464 A1 | 10/2015 | |
| WO | 20150164935 A1 | 11/2015 | |

* cited by examiner

*Primary Examiner* — Arpad Fabian-Kovacs
(74) *Attorney, Agent, or Firm* — Peter Zacharias; Patrick Sheldrake

(57) ABSTRACT

A set of conveyor rollers for use in agricultural machines, especially those of the stalk and tall plants harvester type, including front elements arranged in an independent front platform. The conveyor roller set includes a front aperture (6) for receiving the harvested material (MC) from a platform (P), the set including at least one upper roller (20a) and at least one lower roller (20b) disposed in the platform (A), wherein the upper conveyor roller (20a') has a diameter (D) greater than the diameter (d) of the lower conveyor roller (20b).

12 Claims, 5 Drawing Sheets

CONVEYOR ROLLER SET AND HARVESTING MACHINE

CROSS REFERENCE TO RELATED APPLICATION

This application claims priority to Brazilian Application No. 1020170108546 filed May 24, 2017, the contents of which are incorporated herein by reference.

FIELD OF THE INVENTION

The present invention relates generally to a harvesting machine and more particularly to a conveyor roller set for application in agricultural machines, such as sugarcane and/or sweet sorghum harvesters.

The invention further relates to a harvesting machine, preferably for stalk plants such as cane and/or sorghum, which incorporates the conveyor rollers set to obtain, thereby, high-productivity agricultural apparatuses.

BACKGROUND OF THE INVENTION

According to the state of the art, and as it should be known to those skilled in the art, numerous models of agricultural machines and apparatuses are known to promote increased productivity in the harvesting of various types of plant crops, such as machines for harvesting grains in general, forage machines and machines for harvesting tall stalk plants, such as sugarcane harvesters.

It is known that grain harvesting machines, also known as grain harvesters or combine harvesters, have a configuration that allows harvesting different types of grains, and a header is attached to the front portion of the machine whose characteristics depend on the type of crop to be harvested, such as wheat, soybeans, corn, rice, etc.

In turn, forage machines are agricultural machines designed to harvest and grind a given plant crop to obtain forage, for example hay.

Particularly in relation to tall stalk plants, such as sugarcane, energy cane and sweet sorghum, harvesting machines are designed and developed to promote the harvesting of this specific type of crop, this is why their intrinsic characteristics require specific conditions for their safe and proper processing, from cutting to transfer to overboard baskets and carts.

Therefore, the sugarcane and/or sweet sorghum harvesting machine generally has a fixed opening for receiving and harvesting the planting rows, which are generally spaced at relatively fixed and predetermined distances of 0.9 m or of 1.5 m, or also machines designed to collect two simultaneous rows within these spacings. Optionally, the harvesting machine of this type of plant crop can also have a variable aperture, which can optionally harvest one or two planting rows spaced 0.9 m or 1.5 m apart, or planting rows with spacing alternating between 0.9 and 1.5 m. A proposed solution for a sugarcane harvester having the possibility of adjusting the opening to harvest crops having different spacings between the planting rows is disclosed, for example, in WO2014/026255, which is incorporated herein as a reference.

The cultivation of sugarcane and sweet sorghum goes through a great evolution, both in terms of the development of new varieties of plants, and in terms of different planting configurations, always with the aim of increasing productivity, both in relation to quantity of tons harvested per hectare and in relation to the quantity of alcohol and/or sugar produced per ton harvested. Furthermore, applications of these plant crops are also known for the generation of energy from their biomass, where, unlike the production of alcohol and sugar, not only the part of the plant stalk is used, but also the foliage and, possibly, the inflorescence. Hence, sugarcane varieties destined to the generation of energy, commonly denominated energy cane, are also being developed to increase the amount of fibers and reduce the amount of concentrated sucrose in the plant.

One of the main problems observed in sugarcane and sweet sorghum plantations is that harvesting machines are restricted to in-line harvesting, that is, they can only harvest the crop if it is planted in established planting rows, such as planting rows spaced 0.9 m or 1.5 m, or rows alternately spaced by 0.9 m and 1.5 m. In the case of plantations intended to obtain biomass, planting in rows is not necessary, that is, the planting can be done in a random way and, for this reason, conventional sugarcane and sorghum harvesting machines cannot promote the collection of this material.

One option, in the case of harvesting for biomass generation, would be the replacement of sugarcane and sweet sorghum harvesters by forage machines. However, forage machine do not prove efficient either for harvesting tall stalk plants, such as sugarcane and sweet sorghum, since the platform intended for forage harvesting, such as those provided by Kemper, from Munster, Germany, do not provide a good performance for harvesting this type of plants, because they exhibit great wear, they leave a great amount of biomass in the ground and they are not efficient in feeding the plants to the machine.

Another drawback observed in sugarcane and/or sweet sorghum harvesting machines is the fact that the front elements, such as row dividers, knock-down rollers, base cutting discs and lift rollers, are fastened to the chassis itself of the harvesting machine. As will be appreciated by those skilled in the art, these front elements are those that are most prone to wear, because they are precisely those that are in front line in contact with the soil and the plant culture, besides absorbing impacts. Thus, if any of these front elements are damaged during harvesting and need to be repaired or replaced, the harvesting machine needs to be picked up for proper maintenance and, as a result, the harvesting will be interrupted until the machine is either returned from maintenance or replaced by another machine.

In order to attempt to overcome some of the drawbacks above, documents US 2014/0174048, by CNH America LLC, which is also to be incorporated herein as a reference, discloses a biomass harvesting system consisting of a sugarcane harvester whose basic front elements have been removed to allow the installation of an independent header in front of a conveyor roller set. The header being, for instance, a forage header for harvesting a plant crop, such as sugarcane and/or sweet sorghum, which was planted without a specific planting row pattern. In this sense, the machine disclosed in this document allows a greater variability for harvesting a planted plant crop with no regular planting rows or, in other words, allows harvesting independent of planting rows or lines.

Document BR 10 2015 015922 6, by CNH Industrial Latin America Ltda., discloses a sugarcane harvesting header and the like which can be coupled to the front portion of a harvesting machine, such as the above-mentioned harvester described in document US 2014/0174048, and thereby providing greater flexibility to harvest crops planted with different spacings, being able to change only the header, and not necessarily the whole machine. Moreover, if any of the front elements of the header is damaged during use, it is not necessary to stop the machine, but only change the header.

The platforms are designed to be installed and attached to the front of the machine, interconnecting the passage of harvested material from the platform with the input of material from the harvesting machined and, as can be observed in the above-mentioned documents, both at the outlet of the platform and at the inlet aperture of the harvesting machine there are conveyor roller sets whose purpose is to drag and compact the harvested material until it reaches the chopping rollers provided before the primary extractor.

Such a roller set is usually formed by a sequence of upper and lower roller pairs comprising the same diameter, wherein the upper and lower rollers are spaced from each other and generally the upper roller can move relative to the lower roller through a rail or slot provided in the chassis of the machine and along which the roller can develop an upper or lower angular displacement. The spacing or vertical distance between the lower and upper rollers also promotes the compacting and spreading of the harvested material until it reaches the chopping rollers.

However, the creation of a space between the last platform conveyor roller or the platform lift roller and the first roller of the conveyor roller set provided at the machine inlet aperture is inevitable, precisely in the region of connection of the platform in the machine chassis. Depending on the speed with which the crop is being harvested, as well as on the volume of material being harvested, this space is problematic, because in some situations, some of the material ends up being displaced from its normal flow, and end up passing through the space formed between the conveyor rollers of the platform and the machine, which can cause clogging of the material flow or jamming of the machine, not to mention a possible loss of harvested material.

This type of drawback has been observed more frequently when angular adjustments of the platform are made in relation to the chassis of the harvester. Depending on the angular adjustment required to perform the base cut, the space between the rollers of the platform and the machine increases and, thus, facilitates the deviation of the harvested material.

Another aspect which has been observed in such conveyor roller set is that all or the at least part of the upper rollers are installed in the chassis of the harvesting machine by means of a flotation mechanism, the purpose of which is to work as a compaction element and to promote compaction and distribution of the harvested material until it reaches the chopping rollers.

A known flotation mechanism is formed by wedge-shaped openings having a certain angular radius provided on the walls of the chassis of the harvesting machine and on which the rollers lie. The angle is configured in the same direction of the material flow, that is, as the material is conducted between the lower and upper rollers, the upper rollers can move vertically by obeying the angle of the aperture to adjust to the material flow, (or other additional elements such as springs, for instance) help in the compaction and distribution of harvested material.

Thus, as should be appreciated by those skilled in the art, such harvesting machines, especially those intended for the harvesting of tall stalk plants, such as sugarcane and/or sweet sorghum, with a platform, disclose some limitations and some drawbacks.

SUMMARY OF THE INVENTION

Thus, in light of what has been described above, the present invention aims to provide a set of conveyor rollers for application in agricultural machines, especially those of the sugarcane and/or sorghum harvester type, being designed and developed to improve and enhance state-of-the-art harvesting machines, especially those whose front elements are arranged in an independent front platform.

In this regard, the present invention provides a set of rollers for a harvesting machine whose roller configuration is able to guarantee the inflow of the harvested material, without risk of deflecting it, especially in the region of connection of the platform with the inlet aperture of the harvester.

The present invention also provides a conveyor roller set which is able to increase the feeding speed of the harvested material so as to obtain a significant improvement in the inlet flow of the harvesters and thereby increase harvesting capacity and productivity.

The present invention also provides a harvesting machine, preferably for the harvesting of tall stalk plant crops, such as cane and sorghum, whose front elements such as row dividers, rollers, base cutting discs and lift rollers are installed on a platform that is installed in the material inlet aperture of the machine, where the aforementioned set of conveyor rollers is provided.

The present invention also provides a harvesting machine, preferably for the harvesting of tall stalk plant crops, such as cane and sorghum, the front elements such as row dividers, rollers, base cutting discs and lift rolls are installed on a platform that is installed in the material inlet aperture of the machine, where the aforementioned set of conveyors is provided. The conveyor roller set, according to the present invention, is basically comprised of at least one upper roller and at least one lower roller arranged in the inlet aperture of the agricultural machine, the upper conveyor roller having a diameter greater than diameter of the lower conveyor roller.

More particularly, and in accordance with one embodiment of the present invention, the conveyor rollers set is comprised of a plurality of upper rollers and a plurality of lower rollers, wherein the first upper conveyor roller has a diameter greater than the diameter of the other upper and lower rollers.

Moreover, according to another embodiment of the present invention, the plurality of upper conveyor rollers of the roller assembly is floatingly mounted through the apertures, wherein the aperture responsible for the floating support of the first upper conveyor roller has an angular configuration discordant to the flow of harvested material. More particularly, such apertures have a wedge configuration.

According to a further embodiment of the present invention, the first upper roller comprises a diameter which is about 35 to 55% greater than the diameter of the lower conveyor roller. More particularly, the first upper roller comprises a diameter which is about 46% greater than the diameter of the lower conveyor roller.

Furthermore, according to the present invention, the diameter of the upper and lower conveyor rollers and the diameter of the first upper conveyor roller is in a ratio of 1:1.4. Also, according to another embodiment of the present invention, the diameter of the first conveyor roller is about 306 mm, while the lower conveyor roller has a diameter of the order of 210 mm.

More particularly, this conveyor roller set can be designed and developed to be mounted in an independent module, and it must be coupled and fixed in the chassis of the harvesting machine.

The present invention further relates to a harvesting machine such as for harvesting tall steep plants and is comprised primarily of a self-propelled structure configured to move in a forward direction on a ground surface and including an end and a cavity behind it defining an inlet aperture; a blanket cutter configured to cut the stalks or canes into billets, and an upwardly and backwardly extending lift conveyor loaded in the frame and configured to convey the cut stalks or canes to the billet cutter. It further has a set of conveyor rollers disposed in the cavity comprised between the inlet aperture and the lift conveyor, the conveyor roller set being configured to convey the flow of the harvested stalks or canes gathered in a bundle and, thereby, to transport it to the billet cutter, the assembly comprising at least one upper roller and at least one lower roller, which are positioned at the inlet aperture of the agricultural machine, the first upper conveyor roller having a diameter greater than diameter of the aid lower conveyor roller.

According to one embodiment of the present invention, the harvesting machine is for cutting and harvesting sugarcane and/or sweet sorghum.

BRIEF DESCRIPTION OF THE DRAWINGS

The characteristics, advantages and technical effects of the present invention, as set forth above, will be better understood from the following detailed description, taken by way of example, and not restrictive, of embodiments, and with reference to the accompanying schematic drawings, wherein.

DETAILED DESCRIPTION OF THE INVENTION

Figure 1A:
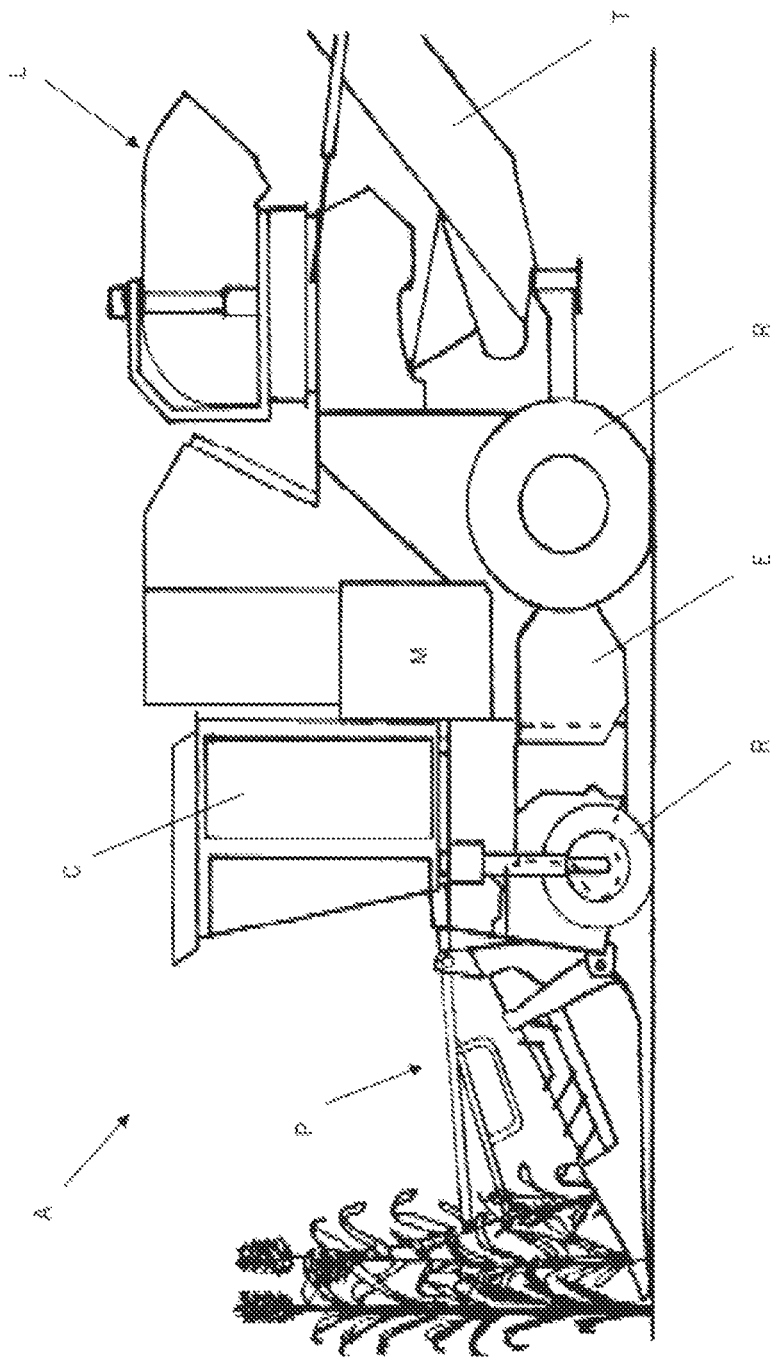
FIG. 1A is a schematic side view of a sugarcane harvesting machine associated with a harvesting platform.

The particular embodiments of the invention are described herein with reference to the appended figures. These figures are schematic and their sizes and/or proportions may not correspond to reality, given that they aim at describing the invention in a didactic manner. Moreover, certain known and common constructive details may have been omitted for greater clarity and conciseness of the description which follows. The used reference numerals are repeated throughout the figures to identify identical or similar parts. Possibly used terms as: "above", "below", "front", "back", "left", etc. and their variations must be construed according to the guidance provided in FIG. 2.

FIG. 1A shows a schematic representation of an agricultural machine (A) of the sugarcane harvester type. Although the present specification relates to a sugar cane harvester, it is clear that the machine may also be employed for the harvesting of other stalk (S) and tall plants such as sorghum.

A harvesting machine (A) may be, for instance, a machine known in the state of the art, made available by CNH Industrial N.V. marketed under the trademark Case IH.

Basically, the harvesting machine (A) includes a chassis (E) mounted on wheels (R) or belts, a drive motor (M), an operation and control cabin (C), a primary cleaning extractor system (L), a billet (T) conveyor with secondary cleaning extractor system (not shown) transferring the billets for, for instance, an overboard baskets or hopper (not shown). Moreover, the harvesting machine (A) is configured to receive a header (P) which is engaged and secured to the front portion of the machine and supports the front elements to promote the cutting of the plants. The machine moves over the ground in a harvesting direction, as represented by arrow (D).

Figure 1B:
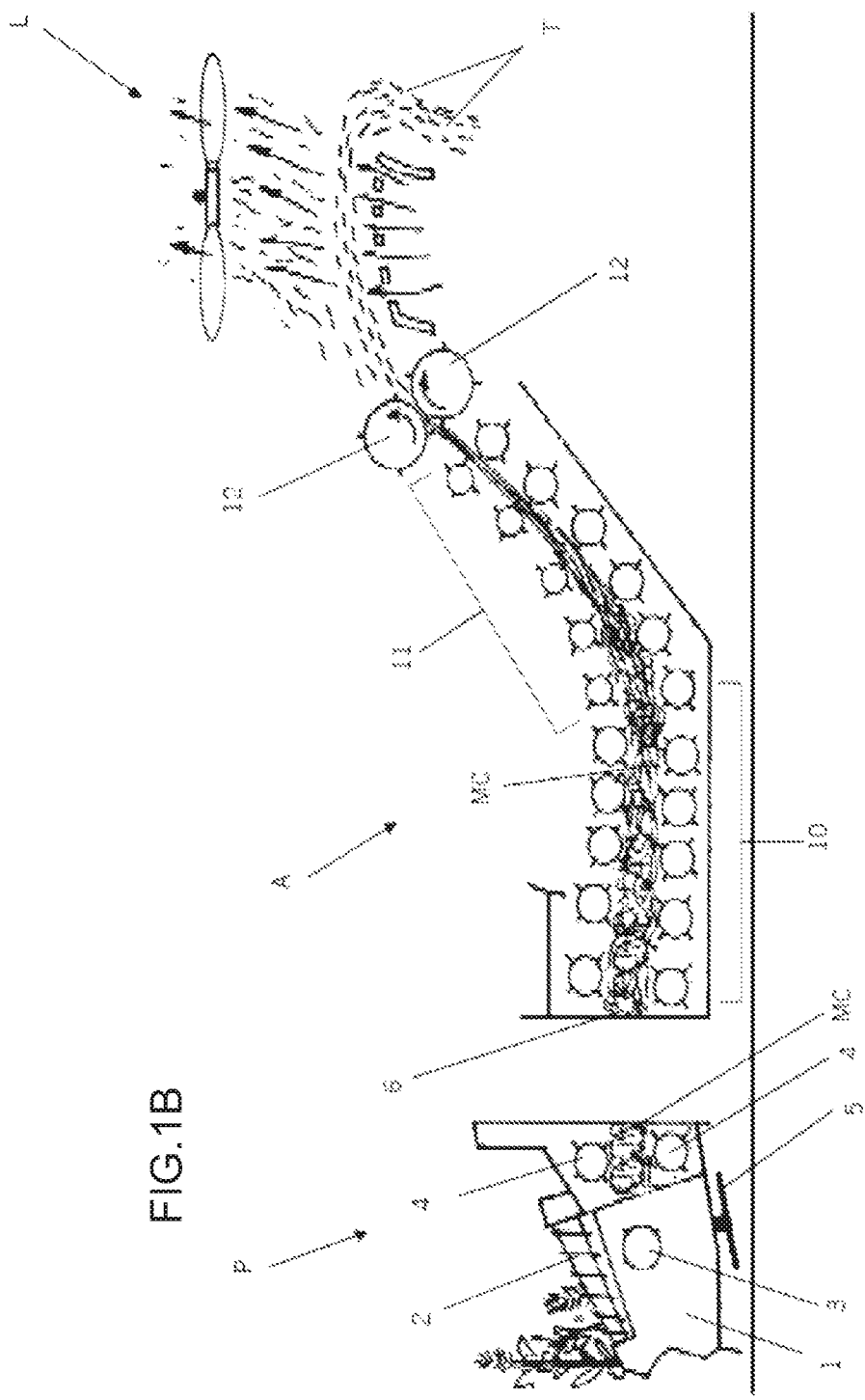
FIG. 1B is also a schematic partial side view showing the inner elements of a harvesting machined associated to a platform, as illustrated and shown in FIG. 1A.

Referring to FIG. 1B, it is noted that a header (P) basically includes a frame 1 which supports row dividers 2, dumper roller 3, lift rollers 4 and base cutting discs 5, (A), in particular, at the inlet aperture 6 of the machine (A). In the inlet aperture 6, there is provided a set of conveyor rollers 10, responsible for dragging and transporting the harvested material (MC) towards the lift roller set 11 to promote the passage of the harvested material (MC) through the chopping rollers 12, which cut the harvested material, such as sugar cane and sweet sorghum, into billets (T), and by the primary extractor system (L) whose purpose is extracting and separating the leaves and small dirt lighter than billets (T). The billets are then conveyed to a secondary lift and extractor (not shown) prior to being unloaded in a hopper or overflow basket, for instance.

A harvester and header as above are described in greater detail, for instance, in US 2014/0174048 and BR 10 2015 0159226, respectively, both incorporated as a reference for the present invention.

Figure 2A:
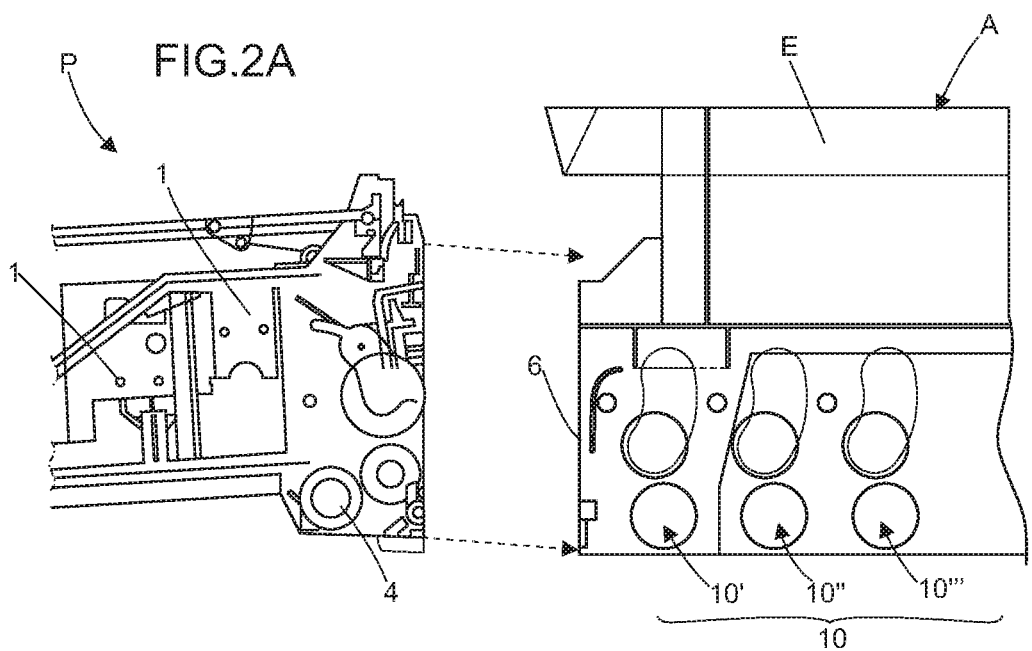
FIGS. 2A and 2B show side cross-sectional views of the front portion of a state-of-the-art harvesting machine, as shown in FIGS. 1A and 1B, especially the arrangement of the header rollers and the set of conveyor rollers at the inlet aperture of the harvesting machined.
Figure 2B:
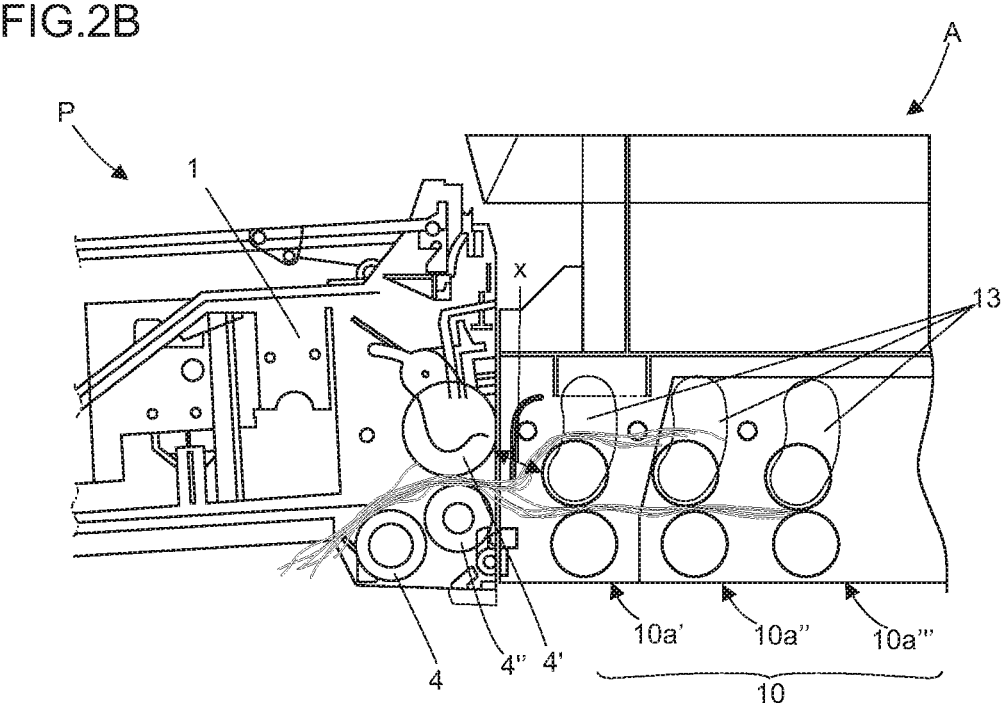

FIGS. 2A and 2B show side cuts in schematic representations of the front portion of the harvesting machine (A), in the region of the connection of the frame 1 of the front header (P) to the machine inlet aperture 6. The set of rollers 10 usually consists of a set of pairs of upper and lower conveyor rollers 10', 10", 10''', all rollers comprising the same diameter. The pairs of rollers are arranged sequentially one behind the other in a vertically shifted manner, that is, without the upper rollers being arranged directly on and vertically aligned with the lower rollers, taking as a reference a vertical line relative to the center of the rollers.

In addition, the upper rollers 10a', 10a", 10a''' are mounted to the chassis (E) of the harvesting machine (A) in a floating condition through wedge-shaped apertures 13 in the same direction of the flow of the material. In this configuration, as shown in FIG. 2B, when the header (P) is connected to the chassis (E) of the harvesting machine (A), a space (X) is formed between the pair of lift rollers 4', 4" of header (P) and the first upper roller 10a' of the first pair of rollers 10' of the set of conveyor rollers 10 provided at the inlet aperture 6 of the machine (A). As mentioned above, this space (X) allows harvested material (MC) to deviate out of the conveyor roller set 10 and, as a result, may cause the machine to jam and/or block during harvesting, not mentioning the possible loss of harvested material.

Within this context, the present invention relates to a set of conveyor rollers 20, which is intended for application in an agricultural machine having a front aperture 6 for receiving the harvested material (MC) from the header (P), the roller set consisting of at least one upper roller 20a and at least one lower roller 20b, which are arranged in the inlet aperture 6 of the agricultural machine (A). More particularly, the first upper conveyor roller 20*a*' comprises a larger diameter (D) than the diameter (d) of the lower conveyor roller 20*b*.

Figure 3A:
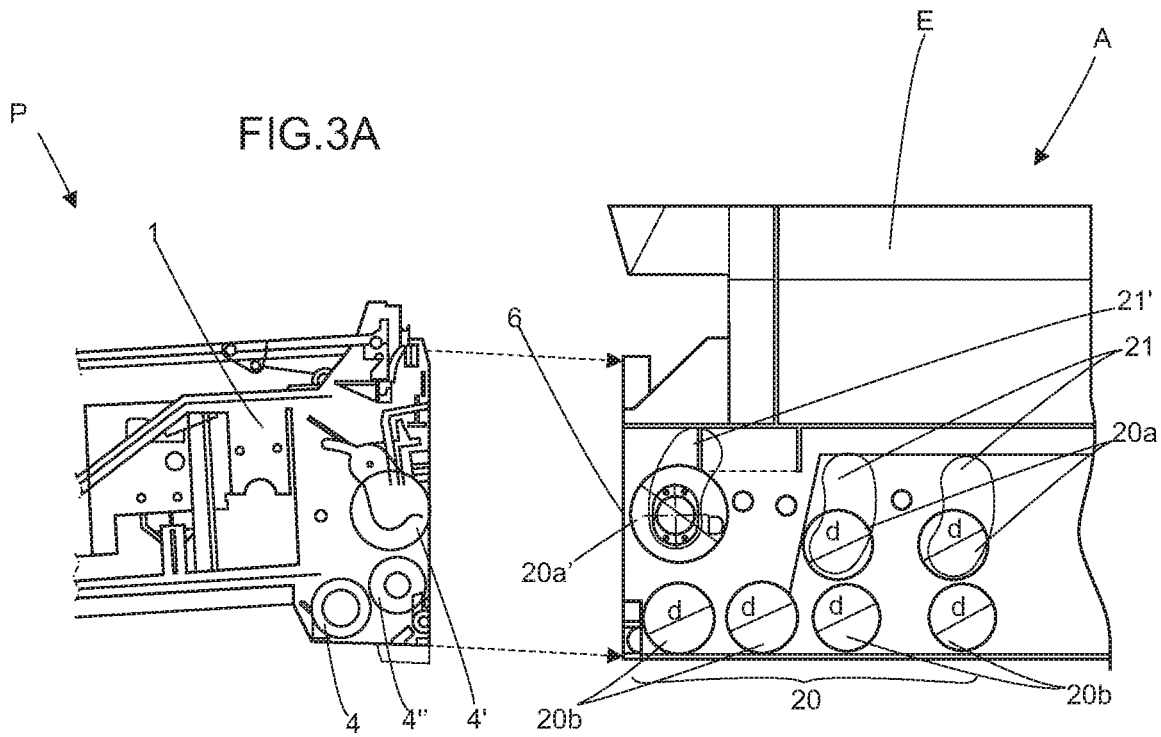
FIGS. 3A and 3B show a schematic representation similar to FIGS. 2A and 2B, but with the representation of a conveyor roller set at the inlet aperture of the harvesting machine, according to an embodiment of the present invention.
Figure 3B:
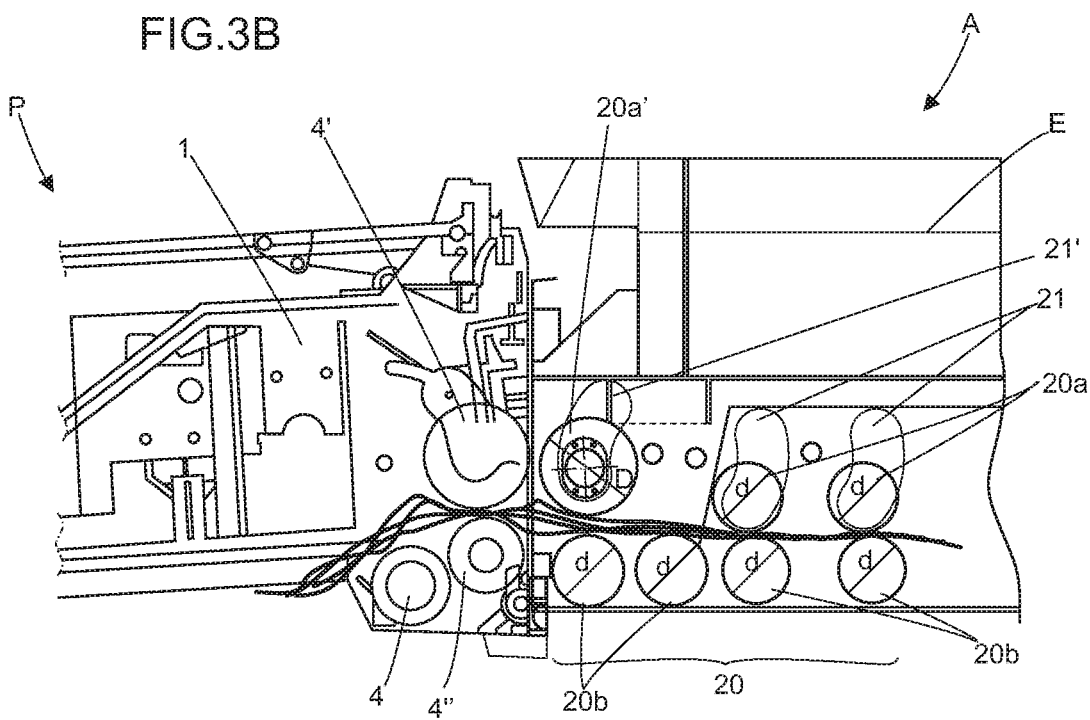
Figure 4:
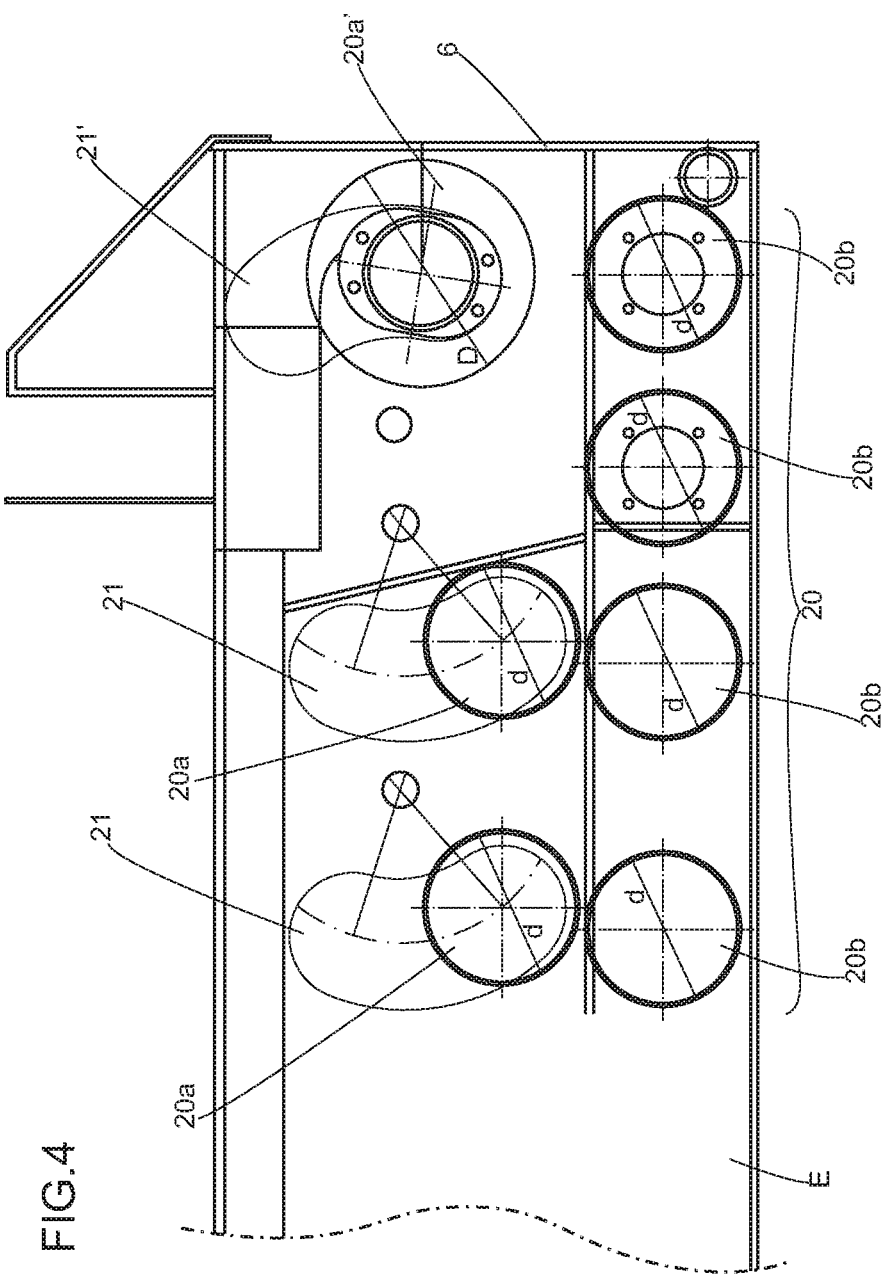
FIG. 4 shows an enlarged side view of the inlet aperture of a harvesting machine containing the conveyor roller set according to an embodiment of the present invention.

According to one embodiment of the present invention, in order to overcome the drawbacks of the prior art, and with particular reference to FIGS. 3A and 3B, the conveyor roller set 20 comprises a sequence of upper rollers 20*a* and a sequence of lower rollers 20*b*, which are arranged at the inlet aperture 6 of the chassis (E) of a harvesting machine (A), wherein first upper conveyor roller 20*a*' comprises a diameter (D) greater than the diameter (d) of the plurality of upper 20*a* and lower 20*b* conveyor rollers, and thereby achieve an increase in the tangential velocity of the first upper conveyor roller 20*a*', improving the material flow and increasing the feeding capacity of the harvested material (MC).

According to a possible embodiment of the present invention, the upper conveyor rollers 20*a*, 20*a*' are floatingly mounted through apertures 21 and 21', wherein aperture 21', supporting the first upper conveyor roller 20*a*', comprises a discordant angular configuration, that is, against the material flow (MC) or, in the representation of FIGS. 3A and 3B, clockwise. Preferably, the configuration of the apertures 21, 21' is wedge-shaped, providing vertical and angular movement of the upper rollers 20*a* and 20*a*'.

As shown in FIG. 3B, it is noted that when the frame 1 of the header (P) is mounted in the front portion of the harvesting machine (A), the first upper conveyor roller 20*a*' is close to the last conveyor roller 4' of the header (P), thereby eliminating the space (X) previously created, regardless of the inclination of the frame (1) of the header (P).

Furthermore, according to one embodiment of the present invention, the first upper conveyor roller 20*a*' has a diameter (D) which is 35 to 55% greater than the diameter (d) of the lower conveyor roller 20*b*. The diameter (D) of the first upper conveyor roller 20*a*' can be approximately 45% greater than the diameter (d) of the lower conveyor roller 20*b*. Within this context, it can be the that the diameter (d) of the conveyor rollers 20*a*, 20*b* and the diameter (D) of the first upper conveyor roller 20*a*' respect a ratio of 1:1.4.

According to one embodiment of the present invention, the first upper conveyor roller 20*a*' comprises a diameter (D) of about 306 mm, while the lower conveyor roller 20*b* comprises a diameter (d) of about 210 mm.

As will be appreciated by those skilled in the art, the conveyor roller assembly 20 may be mounted and installed directly in the chassis (E) of the harvesting machine (A) or, optionally, comprise a module that is engageable in the chassis (E), that is, an independent module which can be connected in the harvesting machine, as well as the front header (P) and, thereby, obtain a harvesting machine capable of being configured.

Finally, and as mentioned above, the present invention also relates to an agricultural machine, such as a harvesting machine (A), which is comprised of a self-propelled structure configured to move forward along a ground surface and including a front end and a cavity behind it defining an inlet aperture; a billet cutter configured to cut the stalks or canes into billets, and an upwardly and rearwardly extending lift conveyor loaded in the frame and configured to convey the cut stalks or canes to the billet cutter. It further has a set of conveyor rollers disposed in the cavity comprised between the inlet aperture and the lift conveyor, the conveyor roller set being configured to convey the flow of the harvested stalks or canes gathered in a bundle and, thereby, to transport it to the billet cutter, the assembly comprising at least one upper roller (20*a*) and at least one lower roller (20*b*), which are arranged at the inlet aperture (6) of the agricultural machine (A), the first upper conveyor roller (20*a*') having a diameter (D) greater than the diameter (d) of the lower conveyor roller (20*b*).

The harvesting machine (A) can be used for harvesting sugarcane and/or sweet sorghum Therefore, considering all of the above, it should be clear that through the conveyor roller set, properly installed in harvesting machines (A), according to the present invention, it becomes possible to obtain a very high productive agricultural apparatus, with aiming at eliminating the risks of clogging and blocking the conveyor rollers, as well as improving the material flows, significantly raising feeding capacity, with a view to eliminating possible spaces conducive to deflecting the flow and increasing the peripheral speed of the first upper conveyor roller.

Finally, in view of all of the foregoing, it is to be stressed that the present description has the only purpose of outlining and defining in an exemplary manner preferred embodiments of the conveyor roller set applied in agricultural machines according to the present invention. Thus, as will be appreciated by those skilled in the art, various modifications and combinations of elements and equivalent details are possible without departing from the scope of protection defined by the appended claims.

What is claimed is:

1. A conveyor roller set for an agricultural machine comprising a front aperture for receiving harvested material from a header, the conveyor roller set comprising:
   at least one upper roller; and
   at least one lower roller disposed in the header,
   wherein the at least one upper roller includes a first upper conveyor roller with a diameter greater than a diameter of the at least one lower conveyor roller, and
   wherein the first upper conveyor roller is close to a last conveyor roller of the header thereby eliminating a space regardless of an inclination of a frame of the header.

2. The conveyor roller set according to claim 1, wherein the at least one upper roller comprises a plurality of upper rollers, and wherein the at least one lower roller comprises a plurality of lower rollers, wherein the first upper conveyor roller has a diameter greater than diameters of the plurality of upper rollers and the plurality of lower rollers.

3. The conveyor roller set according to claim 2, wherein the plurality of upper rollers are floatingly mounted through apertures, including an aperture responsible for a floating support of the first upper conveyor roller with an angular configuration discordant from a flow of the harvested material.

4. The conveyor roller set according to claim 3, wherein the apertures have a wedge configuration.

5. The conveyor roller set according to claim 1, wherein the first upper conveyor roller comprises a diameter which is 35 to 55% greater than a diameter of the at least one lower roller.

6. The conveyor roller set according to claim 5, wherein the diameter of the first upper conveyor roller is approximately 46% greater than the diameter of the at least one lower conveyor roller.

7. The conveyor roller set according to claim 1, wherein diameters of the at least one upper and the at least one lower rollers and a diameter of the first upper conveyor roller have a ratio of 1:1.4.

8. The conveyor roller set according to claim 1, wherein the first upper conveyor roller comprises a diameter around 306 mm, and the at least one lower roller comprises a diameter around 210 mm.

9. The conveyor roller set according to claim 1, wherein the upper and lower rollers are mounted directly on a chassis of the agricultural machine.

10. The conveyor roller set according to claim 1, wherein the upper and lower rollers are mounted in an independent module which is to be connected to the agricultural machine.

11. A harvesting machine comprising:
- a self-propelled structure configured to move forward on a ground surface and including a front end and a cavity behind it defining an inlet aperture;
- a billet cutter configured to cut stalks or canes into billets;
- an upwardly and rearwardly extending lift conveyor, loaded in the frame and configured to convey the cut stalks or canes to the billet cutter; and
- a conveyor roller set disposed in the cavity defined between the inlet aperture and the lift conveyor, the conveyor roller set configured to transport a flow of harvested stalks, to gather the harvested stalks into a bundle, and to transport the bundle to the lift conveyor, to be transported to the billet cutter, the conveyor roller set including:
  - at least one upper roller; and
  - at least one lower roller disposed in the aperture of the agricultural machine,
  - wherein the at least one upper roller includes a first upper conveyor roller which has a diameter greater than a diameter of the at least one lower roller, and
  - wherein the first upper conveyor roller is close to a last conveyor roller of a header thereby eliminating a space at the inlet aperture.

12. The harvesting machine according to claim 11, wherein the harvesting machine is adapted for harvesting sugarcane or sweet sorghum.

* * * * *